UNITED STATES PATENT OFFICE.

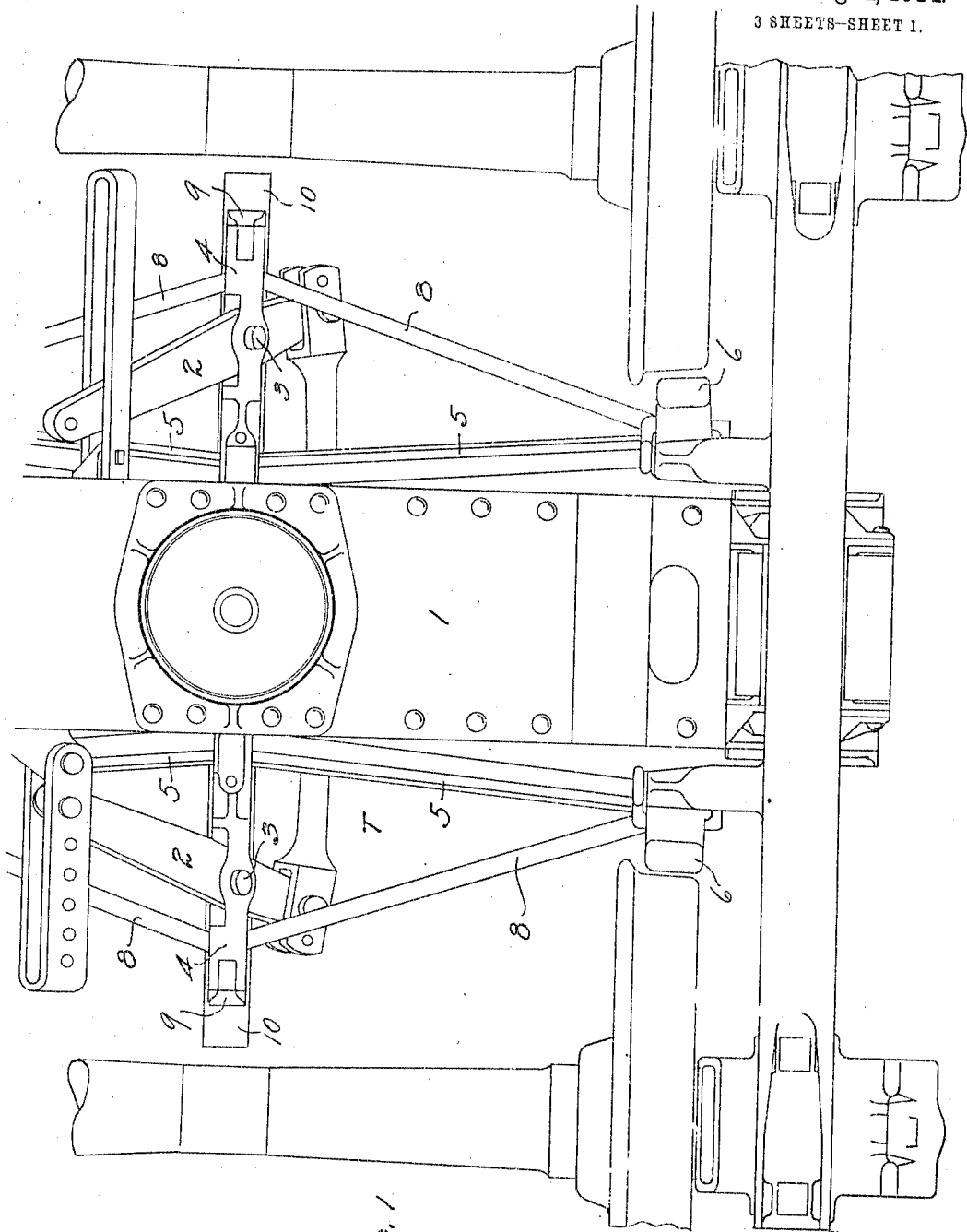

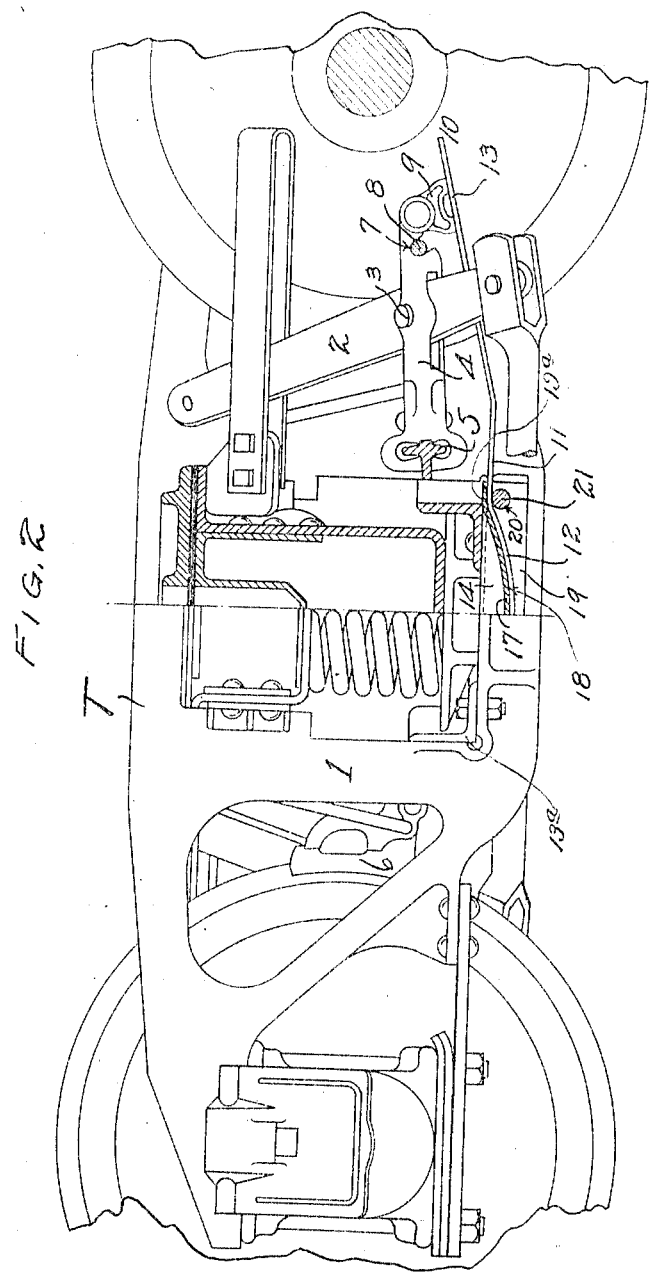

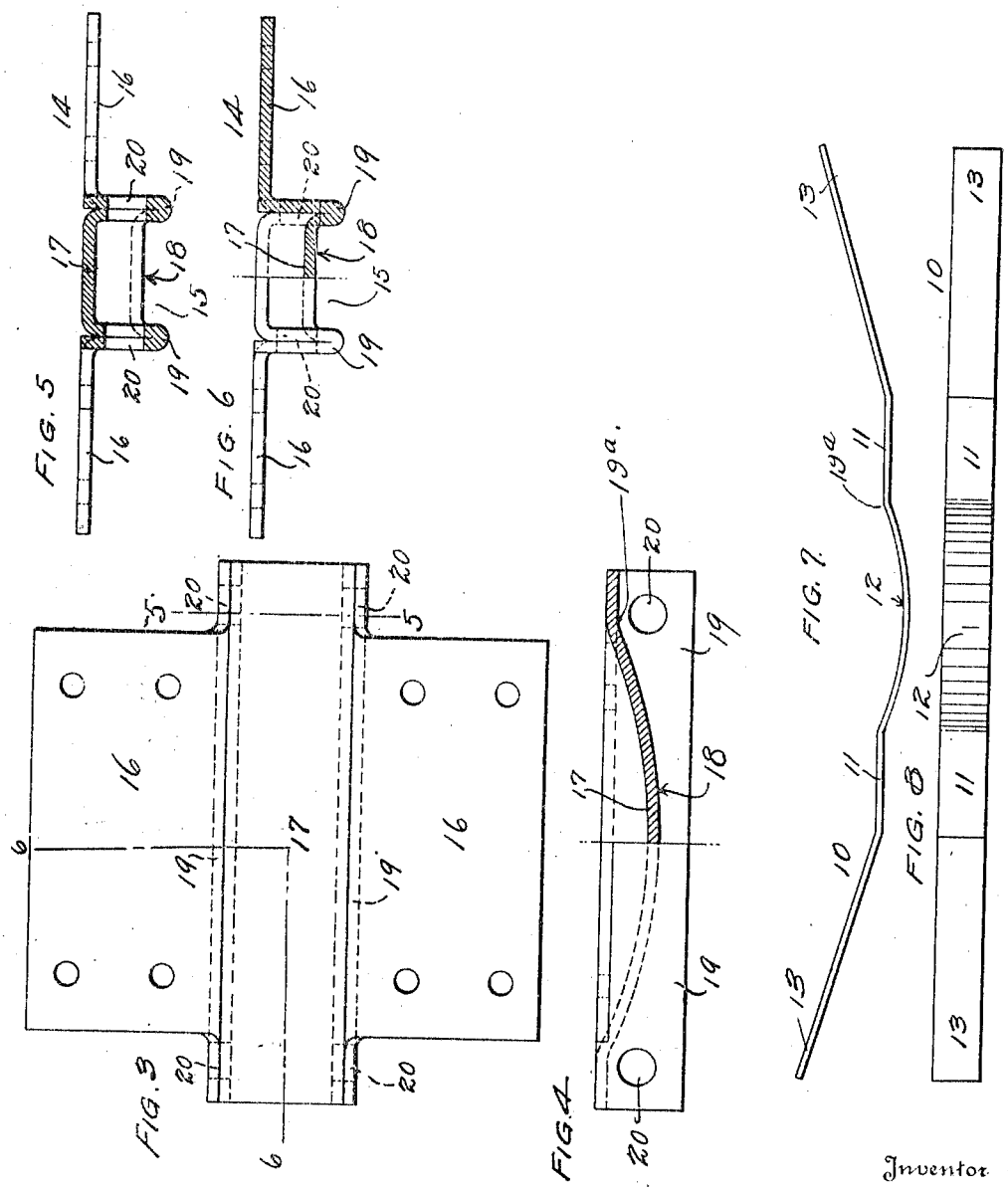

CHARLES E. BARBA, OF ALTOONA, PENNSYLVANIA.

SUSPENSION-SPRING FOR CAR-TRUCKS.

1,106,025.  Specification of Letters Patent.  Patented Aug. 4, 1914.

Application filed October 21, 1913. Serial No. 796,494.

*To all whom it may concern:*

Be it known that I, CHARLES E. BARBA, a citizen of the United States, residing at Altoona, in the county of Blair and State of Pennsylvania, have invented certain new and useful Improvements in Suspension-Springs for Car-Trucks, of which the following is a specification.

This invention relates in general to car trucks, and is of special utility in connection with trucks of the four-wheeled type, wherein the brakes are forced upon the tread of each of the four wheels simultaneously from both sides of the transverse center of the truck.

The primary object of this invention is to provide an improved brake beam supporting spring which is adapted to be held rigidly in place against longitudinal or transverse movement, while at the same time possessing the adequate facilities for its easy removal and replacement which greatly facilitate the building of trucks as well as making repairs to the same.

With these and other objects in view which will more readily appear as the nature of the invention is better understood, the same consists in the novel construction, combination and arrangement of parts hereinafter more fully described, illustrated and claimed.

It will, of course, be understood that the invention is susceptible to structural modifications without departing from the spirit or scope of the invention, but a preferred and practical embodiment of the same is shown in the accompanying drawings, in which—

Figure 1 is a partial plan view showing a four-wheeled car truck embodying the present invention. Fig. 2 is a side elevation partly in section of the part shown in Fig. 1. Fig. 3 is a top plan view of the metallic spring support. Fig. 4 is a side elevation, partly in section, of the support shown in Fig. 3. Fig. 5 is a cross sectional view on the line 5—5 of Fig. 3. Fig. 6 is an end view partly in section of the support shown in Fig. 3, the section being on line 6—6 thereof. Fig. 7 is a side view of the brake beam suspension spring. Fig. 8 is a plan view of the suspension spring shown in Fig. 7.

Similar reference characters designate corresponding parts throughout the several figures of the drawings.

In applying the present invention to trucks of the four-wheeled type now in use no change is necessary in either the structural features of the truck or brake lever rigging thus rendering the invention of special utility.

Referring in detail to the construction shown in the accompanying drawings, the numeral 1 designates the truck frame of a truck T of the well known four-wheeled type. Associated with the truck frame T, are the usual brake levers 2 which are fulcrumed in the conventional manner at 3, and the usual struts 4, which latter are each connected at one of their ends with the compression members 5, which latter are provided at their outer ends, with the usual brake shoes 6. The other end of each strut 4 is provided with a suitable notch 7 which receives the usual tension member 8, and at its free end has pivotally connected thereto a brake beam supporting shoe 9 which is suitably arranged to slide upon a brake beam supporting spring 10 arranged longitudinally of the truck and in the center thereof as shown in Fig. 1 of the drawings.

The body 11 of the said brake beam suspension spring 10 is provided with a central concave portion 12, and the angularly disposed arms 13, which are adapted to carry the brake beam supporting shoe 9 at their free ends as shown in Figs. 1 and 2 of the drawings.

The truck proper is provided with a plurality of transverse tie bars 13ª, which are adapted to carry a suspension spring clamp 14. The said suspension spring clamp 14 is preferably positioned on the longitudinal center line of the truck in direct alinement with the center of the brake beam and the suspension spring. The spring clamp 14 is pressed so as to form a channel 15, from the bottom thereof and also laterally extending wings or attaching flanges 16. The bottom 17 of said channel is convexed to form a suspension spring bearing surface 18 while the depending walls 19 of the said channel prevent lateral displacement of the suspension spring 10. The said depending spaced apart walls 19 of the channel 15 are parallel and have oppositely located bolt receiving openings 20 adjacent their outer ends.

In view of the foregoing description of the various essential structural details of the present invention, it will quite readily be seen that the suspension spring clamp 14, is detachably fitted to the underside of the transverse angle tie bars 13ª, by means of suitable fasteners which coöperate with the attaching flanges 16, and that the suspension spring 10 is placed in the channel 15 so that it extends longitudinally of the truck proper.

The concave portion 12 of the suspension spring 10 bears against the surface 18 of the channel 15, which is an integral part of the suspension spring clamp, and that the said suspension spring 10 is detachably held to said suspension spring clamp 14 by means of the bolts 21 which pass through the alined bolt receiving openings 20 in the walls 19 of the channel and engage the suspension spring at the junction 19ª, of the concave portion 12 with the body 11, thus effectively locking the suspension spring to the suspension spring clamp so as to prevent longitudinal movement or creeping in the channel.

It is believed to be apparent from the foregoing description and accompanying drawings that I have made a decided improvement in brake beam suspension devices, inasmuch as by employing a suspension spring in the manner explained the attachment and detachment is readily accomplished, and further when properly put in place the device not only supports the brake beam at its proper angle with reference to the transverse center line of the truck wheels, but also possesses the required elements of rigidity and stability which are so essential to modern railway trucks.

I claim:

1. In a car truck the combination with a truck frame, transverse tie bars, brake beams and brake beam supporting shoes, of a suspension spring arranged longitudinally of the truck having a central concave portion and also having free inclined end portions, and detachable means for rigidly clamping the central concave portion of the spring to the truck.

2. In a car truck the combination with the truck frame, transverse tie bars, brake beams and brake beam supporting shoes, of a suspension spring arranged longitudinally of the truck and having a central concave portion and oppositely disposed free inclined end portions, said inclined end portions being unconnected with, but in bearing contact with said brake beam supporting shoes, and detachable means for rigidly clamping the central portion of the spring to the truck.

3. In a car truck the combination with the truck frame, transverse tie bars, brake beams and brake beam supporting shoes, of a clamp detachably fitted to said transverse angle tie bars, a suspension spring having a concave portion adapted to be engaged by the clamp, and means for drawing the spring and clamp together to prevent longitudinal movement of the suspension spring.

4. In a car truck, the combination with the truck frame and brake beam, of a clamp having a suspension spring receiving channel adapted to be fitted to the transverse tie bars of the truck, a suspension spring arranged longitudinally of the truck and lying within the channel of the clamp, and a plurality of bolts which are adapted to bind the spring to the clamp so as to prevent longitudinal movement.

5. In a car truck, the combination with the frame and brake rigging of a clamp having a central channeled portion, the bottom of which presents a convexed suspension spring bearing surface and the depending spaced apart side walls of which are provided with oppositely located alined openings, attaching flanges extending laterally from the channeled portion, a suspension spring arranged longitudinally of the truck and adapted to lie within and be clamped in position within the channeled portion of the binder, and means for entering the openings in the walls of the channel to detachably lock the suspension spring to the clamp.

In testimony whereof I affix my signature in presence of two witnesses.

CHARLES E. BARBA.

Witnesses:
 B. C. McCORMICK,
 C. C. MOYER.